3,026,193
FERTILIZER COMPOSITIONS

John William Baynham, Leith, Scotland, assignor to Scottish Agricultural Industries Limited, Edinburgh, Scotland, a corporation of Great Britain
No Drawing. Filed Jan. 15, 1960, Ser. No. 2,581
Claims priority, application Great Britain Jan. 22, 1959
2 Claims. (Cl. 71—50)

The present invention relates to compositions suitable for use as solid fertilizers, in particular to such compositions containing ammonium nitrate.

Ammonium nitrate is well suited in many ways as a fertilizer. It is a relatively concentrated source of one of the major plant foods, nitrogen: moreover, this nitrogen is present in two forms, ammoniacal and nitrate, which extends its range of applicability. It is often desired to incorporate substances containing two other major plant foods, i.e. phosphorus and potassium, with ammonium nitrate to form what is known as a mixed NPK fertilizer.

The caking of ammonium nitrate is a major difficulty in the employment of the salt in the fertilizer industry. It is known that ammonium nitrate can exist in several forms of differing crystallographic structure, two of which are known as form III and form IV. Ammonium nitrate III is normally stable in the temperature range 32° C. to 84° C. Below 32° C. it is converted to ammonium nitrate IV, but the transition of III⇌IV is not always sharp and under some conditions a metastable form can exist. It is recognised, however, that hard setting of ammonium nitrate can follow from transition of slightly moist or even plant-dried material from one form to the other. The temporary persistence of a metastable phase, which is relatively more soluble, is thought to be a contributory factor to the increase in the caking propensity of ammonium nitrate.

Further, there is an appreciable volume increase when ammonium nitrate IV is converted to the III form which can give rise to undesirable effects during storage. Containers, such as paper bags and even steel drums, full of ammonium nitrate have been known to burst when atmospheric conditions cause the temperature of the ammonium nitrate to rise above 32° C., the transition temperature of the two crystalline forms.

In the past, the transition temperature for the change ammonium nitrate III to IV has been successfully lowered by the incorporation of potassium nitrate as a solid solution: in this manner ammonium nitrate III may be stabilized at normal atmospheric temperatures.

We have now found that the water-insoluble potassium metaphosphate $(KPO_3)_n$, also known as potassium Kurrol's salt, when mixed with form III ammonium nitrate will stabilize a proportion in that form even at temperatures below 32° C. and further that when mixed with form IV ammonium nitrate at a temperature below 32° C. the metaphosphate will, without application of heat, convert form IV nitrate to form III nitrate which will be structurally stable to temperature fluctuations about the transition temperature.

The degree of conversion and stabilization will depend on such factors as the proportion of the potassium metaphosphate, the particle size of the components of the mixture and time; but in general, under similar conditions, the metaphosphate is more effective than potassium nitrate or potassium chloride.

The present invention therefore provides compositions suitable for use as fertilizers comprising ammonium nitrate and potassium metaphosphate.

It will be appreciated that in addition to exerting a stabilizing effect on the ammonium nitrate, the metaphosphate provides a source of plant nutrients since, although it is insoluble in water, it does dissolve in soil solutions and becomes available to plants. The compositions of the present invention are very useful fertilizers in that they are highly concentrated, containing about 60% by weight of plant foods, i.e., N, $P_2O_5$ and $K_2O$, and are relatively low in chloride which in some circumstances is deleterious to plant growth. In addition, the potassium metaphosphate also acts as a conditioning agent, as well as a stabilizing agent, assisting in maintaining the compositions in a free flowing condition on storage.

As stated above, the degree of conversion to form III and stabilization of that form depends on the proportion of potassium metaphosphate in the mixture and the mixture preferably should contain at least 10% by weight of the potassium metaphosphate. Preferred ratios of potassium metaphosphate to ammonium nitrate are from 1:4 to 9:1 by weight.

Further, the finer the grist of the particles of ammonium nitrate and potassium metaphosphate, the higher is the degree of conversion and stabilization. We have found that a particle size for both components of less than 30 mesh B.S.S. is quite satisfactory, but better results are of course obtained with particle sizes of 100 mesh B.S.S. or less.

The compositions of this invention may be prepared by mixing the potassium metaphosphate with either of the two forms of ammonium nitrate. If mixed with form IV, the degre of conversion improves, within limits, on allowing the mixture to stand. Conveniently, the metaphosphate may be mixed with hot ammonium nitrate as it is produced since some form III nitrate will then be stable even on cooling below 32° C. to ambient temperature. This may obviate the necessity of cooling ammonium nitrate to below the transition temperature before storage.

The effect of the potassium metaphosphate $(KPO_3)_n$ is illustrated in the following tables.

Table I shows the proportion of form III stabilized when potassium metaphosphate of particle size passing 300 mesh B.S.S. is mixed with ammonium nitrate of particle size 150–200 mesh B.S.S. at a temperature above 32° C. and allowed to cool to room temperature. The IV:III ratios given in Tables I, II, III and IV were determined by intensity measurements of X-ray powder diffraction photographs.

TABLE I

| Weight ratio nitrate:phosphate | Weight ratio IV:III |
|---|---|
| 4:1 | 2:3 |
| 9:1 | 2:3 |
| 19:1 | 3:2 |
| 49:1 | 6:1 |

Ammonim nitrate and potassium metaphosphate were ground together below 32° C. in the various proportions to a particle size of approximately 60 mesh B.S.S. and the ratio of form IV to form III nitrate in each mixture was determined after 12 hours. The results obtained are shown in Table II.

TABLE II

| Weight ratio nitrate:phosphate | Weight ratio IV:III |
|---|---|
| 1:1 | 2:3 |
| 2:1 | 1:1 |
| 6:1 | 3:2 |
| 19:1 | 4:1 |

The effect of varying the particle size of the components mixed in a weight ratio of nitrate to phosphate of 2:1 is shown in Table III.

TABLE III

| Nitrate, mesh B.S.S. | Phosphate, mesh B.S.S. | Nitrate IV:III |
|---|---|---|
| 30–60 | 300 | 3:2 |
| 60–100 | 300 | 1:1 |
| 100–150 | 300 | 2:3 |
| Passing 150 | 60 | 2:1 |
| Passing 150 | 300 | 2:3 |

As stated above, the degree of conversion improves, within limits, on allowing the mixtures to stand. For example, in a mixture of 2 parts nitrate of particle size passing 150 mesh B.S.S. and 1 part phosphate of particle size passing 300 mesh B.S.S., the ratios of form IV to form III, 1 hour, 6 hours and 23 hours after mixing, were 3:1, 1:1 and 2:3 respectively.

The effectiveness of potassium metaphosphate as compared with potassium chloride and potassium nitrate used under identical conditions is illustrated in Table IV which shows the percentage conversion to form III by mixing form IV with the various potassium salts.

TABLE IV

| Additive | Nitrate IV:III |
|---|---|
| KCl | 7:3 |
| $KNO_3$ | 3:2 |
| $(KPO_3)_n$ | 1:1 |

The corresponding sodium salts produced no conversion under the same conditions.

The invention is illustrated by the following examples.

Example 1

A moist mixture which contained 52 parts ammonium nitrate and 48 parts of a fertilizer grade of potassium Kurrol's salt ($P_2O_5$ content=52%, $K_2O$ content=38%) was granulated by tumbling in a rotating drum. The granules were subsequently dried at 120° C.

The granules so produced were suitable for use as an NPK fertilizer, 18:25:18. The ammonium nitrate in the granules was shown by X-ray analysis to be wholly in the form III even at atmospheric temperatures.

Minor proportions of substances providing additional sources of plant foods may be incorporated in the fertilizers of the present invention. Trace elements may also be incorporated.

Example 2

A composition consisting of 47 parts of ammonium nitrate, 32 parts of a fertilizer grade of potassium Kurrol's salt ($P_2O_5$ content=52%, $K_2O$ content =38%), and 21 parts of muriate of potash (60% $K_2O$) was moistened, pelleted and dried to give a 16½:16½:25 fertilizer. The ammonium nitrate present in the product as shown by X-ray analysis was completely in the form III.

What I claim is:

1. A granular composition suitable for use as a fertilizer consisting essentially of ammonium nitrate and insoluble potassium metaphosphate (potassium Kurrol's salt), wherein said ammonium nitrate is stabilized in crystalline form III for temperatures below 32° C., and wherein said ammonium nitrate and potassium metaphosphate are in a ratio of from 1:9 to 4:1 by weight.

2. A method for the production of particulate material, individual particles of which contain ammonium nitrate and potassium metaphosphate wherein a mixture consisting essentially of ammonium nitrate and substantially water-soluble potassium metaphosphate (potassium Kurrol's salt) in a ratio from 1:9 to 4:1 is granulated and heated to a temperature above 32° C. for a period of time at least sufficient to free said mixture from ammonium nitrate in crystalline form IV thereby to produce a particulate material in which at temperatures below 32° C. the ammonium nitrate is in crystalline form III and is free from crystalline form IV.

References Cited in the file of this patent

UNITED STATES PATENTS

| 2,166,579 | Cairns | July 18, 1939 |
| 2,657,977 | Stengel et al. | Nov. 3, 1953 |
| 2,837,418 | Seymour | June 3, 1958 |
| 2,874,027 | Gloss | Feb. 17, 1959 |
| 2,957,763 | Barnes | Oct. 25, 1960 |